(12) United States Patent
Sawatani et al.

(10) Patent No.: US 8,640,385 B2
(45) Date of Patent: Feb. 4, 2014

(54) TRIM ATTACHMENT STRUCTURE

(75) Inventors: Satoshi Sawatani, Kariya (JP); Yuichi Tsubokawa, Kariya (JP); Keigo Oseto, Kariya (JP); Yasuaki Kawakami, Anjo (JP); Yasutaka Hasegawa, Toyota (JP)

(73) Assignees: Aisin Seiki Kabushiki Kaisha, Kariya-shi, Aichi-ken (JP); VTEC Co., Ltd., Anjo-shi, Aichi-ken ( * ) Notice: Subject to any disclaimer, the term of this patent is extended or adjusted under 35 U.S.C. 154(b) by 28 days.

(21) Appl. No.: 13/138,438

(22) PCT Filed: Feb. 22, 2010

(86) PCT No.: PCT/JP2010/052601
§ 371 (c)(1),
(2), (4) Date: Aug. 16, 2011

(87) PCT Pub. No.: WO2010/095734
PCT Pub. Date: Aug. 26, 2010

(65) Prior Publication Data
US 2011/0296764 A1   Dec. 8, 2011

(30) Foreign Application Priority Data
Feb. 23, 2009  (JP) ................... 2009-039874

(51) Int. Cl.
*E06B 7/16* (2006.01)
(52) U.S. Cl.
USPC ........................................ 49/492.1

(58) Field of Classification Search
USPC .......... 49/489.1, 492.1, 502; 24/297, 581.11, 24/458; 292/1, 80, 81, 87, DIG. 38, 292/DIG. 70
See application file for complete search history.

(56) References Cited

U.S. PATENT DOCUMENTS 4,506,419 A * 3/1985 Mitomi ....................... 24/297
4,511,129 A   4/1985 Kishino
(Continued)

FOREIGN PATENT DOCUMENTS

CN        201026847        2/2008
CN        201102515        8/2008
(Continued)

OTHER PUBLICATIONS

Office Action dated Aug. 21, 2012 from U.S. Appl. No. 12/733,588.
(Continued)

*Primary Examiner* — Jerry Redman
(74) *Attorney, Agent, or Firm* — Finnegan, Henderson, Farabow, Garrett & Dunner, LLP (57) ABSTRACT

A trim attachment structure includes a door frame, trim and a clip. The door frame has an attachment part, which is formed by a single plate, and a fitting hole. The fitting hole has a square shape in which the diagonals thereof are aligned with specific directions. The trim has a pair of ribs respectively facing a pair of end parts of the fitting hole. The clip is installed in the fitting hole. The clip includes a head part, a tube part and a latching hook. The tube part has a tip end part which projects from the fitting hole to the outer side of the attachment part. Angled parts of the tip end part are held between the ribs. The latching hook is latched at the peripheral edge of the fitting hole on the outer side of the attachment part.

5 Claims, 6 Drawing Sheets

(56) References Cited

U.S. PATENT DOCUMENTS

| | | | |
|---|---|---|---|
| 4,927,306 A * | 5/1990 | Sato | 411/182 |
| 5,533,237 A * | 7/1996 | Higgins | 24/289 |
| 5,651,634 A * | 7/1997 | Kraus | 403/408.1 |
| 5,702,148 A | 12/1997 | Vaughan et al. | |
| 5,968,614 A | 10/1999 | Reichenberger et al. | |
| 6,141,837 A * | 11/2000 | Wisniewski | 24/295 |
| 6,381,811 B2 * | 5/2002 | Smith et al. | 24/289 |
| 6,485,049 B1 | 11/2002 | Prottengeier et al. | |
| 6,772,484 B2 * | 8/2004 | Miyano et al. | 24/297 |
| 6,811,194 B1 | 11/2004 | Gaertner et al. | |
| 6,889,472 B2 | 5/2005 | Nozaki et al. | |
| 7,210,730 B2 | 5/2007 | Fujita et al. | |
| 7,231,696 B2 * | 6/2007 | Asano et al. | 24/297 |
| 7,264,306 B2 | 9/2007 | Nakao et al. | |
| 7,410,206 B2 | 8/2008 | Koarai | |
| 7,461,436 B2 * | 12/2008 | Asano | 24/297 |
| 2002/0043041 A1 * | 4/2002 | Yoyasu | 52/716.5 |
| 2005/0034282 A1 * | 2/2005 | Kurily et al. | 24/297 |
| 2005/0086773 A1 * | 4/2005 | Kuhnle et al. | 24/297 |
| 2005/0229514 A1 | 10/2005 | Nakao et al. | |
| 2006/0000064 A1 * | 1/2006 | Leverger et al. | 24/297 |
| 2006/0230587 A1 * | 10/2006 | Okada | 24/297 |
| 2008/0116713 A1 * | 5/2008 | Jun et al. | 296/146.2 |
| 2008/0201920 A1 * | 8/2008 | Jatzke | 24/458 |
| 2008/0282617 A1 | 11/2008 | Zimmer | |
| 2008/0298890 A1 * | 12/2008 | Koike | 403/408.1 |
| 2009/0199371 A1 * | 8/2009 | Katoh et al. | 24/458 |
| 2010/0115851 A1 | 5/2010 | Nakao et al. | |
| 2010/0293761 A1 * | 11/2010 | Koike et al. | 24/458 |
| 2011/0296764 A1 | 12/2011 | Sawatani et al. | |
| 2012/0023715 A1 * | 2/2012 | Nakajima | 24/458 |

FOREIGN PATENT DOCUMENTS

| | | |
|---|---|---|
| JP | 2-26927 | 2/1990 |
| JP | 3-28052 | 3/1991 |
| JP | 3-100514 | 10/1991 |
| JP | 3-107326 | 11/1991 |
| JP | 7-34209 | 6/1995 |
| JP | 11-291762 | 10/1999 |
| JP | 2004-338522 | 12/2004 |
| JP | 2007-302186 | 11/2007 |
| JP | 2009-023630 | 2/2009 |
| WO | WO 2008/133115 | 11/2008 |
| WO | WO 2009/119318 | 10/2009 |

OTHER PUBLICATIONS

International Search Report dated Jun. 1, 2010.
Notification of the First Office Action for Chinese Appl. No. 201080008188.4 dated Apr. 2, 2013.

* cited by examiner

TRIM ATTACHMENT STRUCTURE

BACKGROUND

The present invention relates to a garnish coupling structure that couples a garnish, which covers a door frame forming a window sash of a vehicle door, to the door frame.

Figure 5:
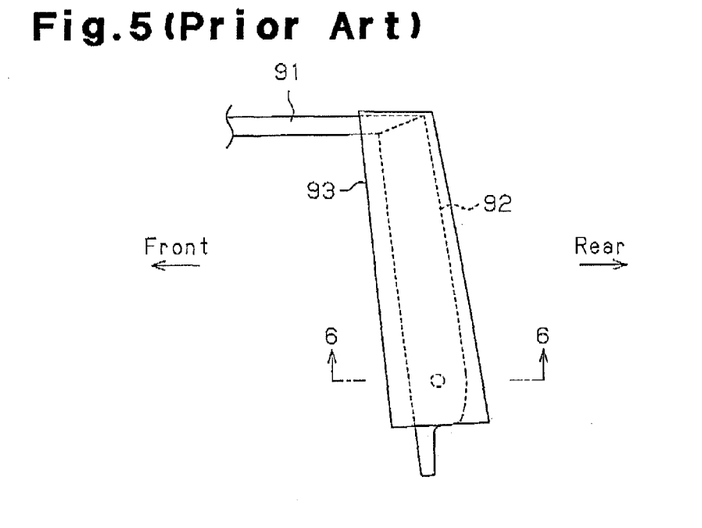
FIG. 5 is a cross-sectional view showing a garnish coupling structure of the prior art.
Figure 6:
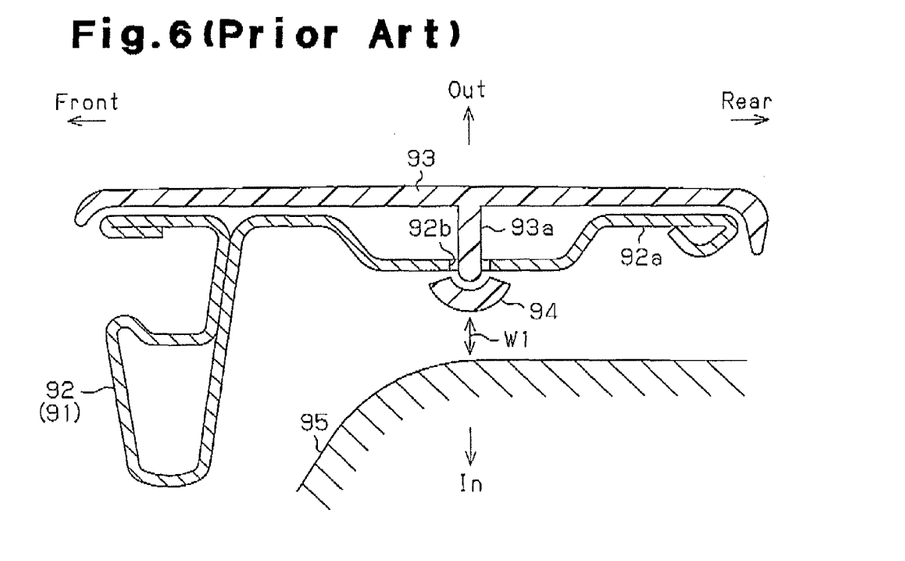
FIG. 6 is a cross-sectional view showing a garnish coupling structure of the prior art.

Published Japanese application No. 2004-338522 discloses one example of a garnish coupling structure. FIG. 5 is a side view showing an upper portion of a vehicle door, to which such a garnish coupling structure of the prior art is applied, from an outer side of the vehicle in a widthwise direction. FIG. 6 is a cross-sectional view taken along line 6-6 in FIG. 5.

FIG. 5 shows a door frame 91, which forms a window sash of a vehicle door. The door frame 91 includes a frame portion 92, which is located toward the rear of the vehicle. A garnish 93 covers the frame portion 92 from the outer side in the widthwise direction of the vehicle.

The frame portion 92 is formed, for example, by roll-molding a metal plate that has a generally uniform cross-sectional shape in the longitudinal direction. As shown in FIG. 6, the frame portion 92 includes a plate-shaped coupling portion 92a, which forms the rear edge of the frame portion 92, and a fitting hole 92b, which extends through the coupling portion 92a in the thickness-wise direction (the vertical direction of FIG. 6). The garnish 93 includes a rib 93a, which extends toward the coupling portion 92a so as to be fitted into the fitting hole 92b. The rib 93a is fitted to the fitting hole 92b to couple the garnish 93 to the frame portion 92.

SUMMARY OF THE INVENTION

The fitting hole 92b, into which the rib 93a of the garnish 93 is fitted, is formed in the plate-shaped coupling portion 92a. Thus, rust and the like formed in a region near the coupling location (rib 93a and the like) are exposed to the inner side of the vehicle in the widthwise direction (inner side of vehicle door). This adversely affects the aesthetic appearance. To prevent the aesthetic appeal from being deteriorated, a clip 94 may be attached to the rib 93a to cover the rib 93a and the surrounding of the rib 93a. However, the rib 93a is projected out of the fitting hole 92b toward the inner side of the vehicle in the widthwise direction by a sufficient projection amount so that the rib 93a does not separate from the fitting hole 92b. Accordingly, when the clip 94 is overlapped with the rib 93a from the inner side of the vehicle in the widthwise direction, a large layout space would be required in the longitudinal direction of the rib 93a. This would result in the clip 94 and an opposing portion 95 (side member) of the vehicle body being spaced by a distance W1 that is null or subtle.

It is an object of the present invention to provide a garnish coupling structure that improves the aesthetic appearance while increasing the layout space.

To solve the above problem, one aspect of the present invention provides a coupling structure including a door frame, a garnish, and a clip. The door frame is adapted to form a window sash of a vehicle door. The door frame includes a coupling portion and a fitting hole. The coupling portion is formed by a single plate. The fitting hole extends through the coupling portion in a thickness-wise direction of the coupling portion. The fitting hole has a square shape and includes a diagonal extending in a predetermined direction. The garnish faces toward the coupling portion of the door frame and covers the door frame from an outer side in a widthwise direction of the vehicle. The garnish includes two ribs. The two ribs extend inward in the widthwise direction of the vehicle and respectively face two ends of the fitting hole that lie along the diagonal. The two ribs are arranged parallel to each other and separated by a distance in the predetermined direction. The clip is attached to the fitting hole. The clip includes a head, a tube, which has a square cross-section, and an engagement hook. The head is bonded to a rim of the fitting hole at an inner side of the coupling portion in the widthwise direction of the vehicle. The tube projects from the head and is fitted into the fitting hole. The engagement hook is arranged on a side surface of the tube. The tube includes a distal portion projecting through the fitting hole and outward from the coupling portion in the widthwise direction of the vehicle. The two ribs hold two corners of the distal portion lying along the predetermined direction. The engagement hook is engaged with the rim of the fitting hole at the outer side of the coupling portion in the widthwise direction of the vehicle.

In this structure, the clip is engaged with the rim of the fitting hole at the outer side of the vehicle. This prevents separation of the clip from the fitting hole (coupling portion). The two ribs hold the two corners in the predetermined direction of the distal portion of the tube that project outward of the vehicle from the fitting hole to couple the garnish to the door frame with the clip. In this case, the head, which is bonded to the rim of the fitting hole toward the inner side of the vehicle, covers the fitting hole. Thus, the fitting hole and rust formed around the fitting hole are not exposed inward in the widthwise direction of the vehicle (inner side of the vehicle door 1). This improves the aesthetic appeal. Further, the head is bonded to the rim of the fitting hole in the coupling portion at the inner side of the vehicle. Thus, the projection length of the clip from the coupling portion inward in the vehicle is within the thickness range of the head. This prevents the layout space from being increased at the inner side of the vehicle. Further, the two ribs hold the two corners of the tube lying in the predetermined direction and are arranged so that the distance between the two is longest. Accordingly, the engagement hooks are arranged in the space formed between the two ribs and tube. Even when, for example, the engagement hooks are arranged on only some of the four side surfaces of the tube, interference between the engagement hooks and the two ribs does not occur as long as the tube is located at any one of angular positions located every 90 at which the tube can be fitted to the fitting hole. Accordingly, restrictions are reduced on the angular position of the tube (clip). This improves the coupling efficiency.

DETAILED DESCRIPTION OF THE PREFERRED EMBODIMENTS

Figure 4:
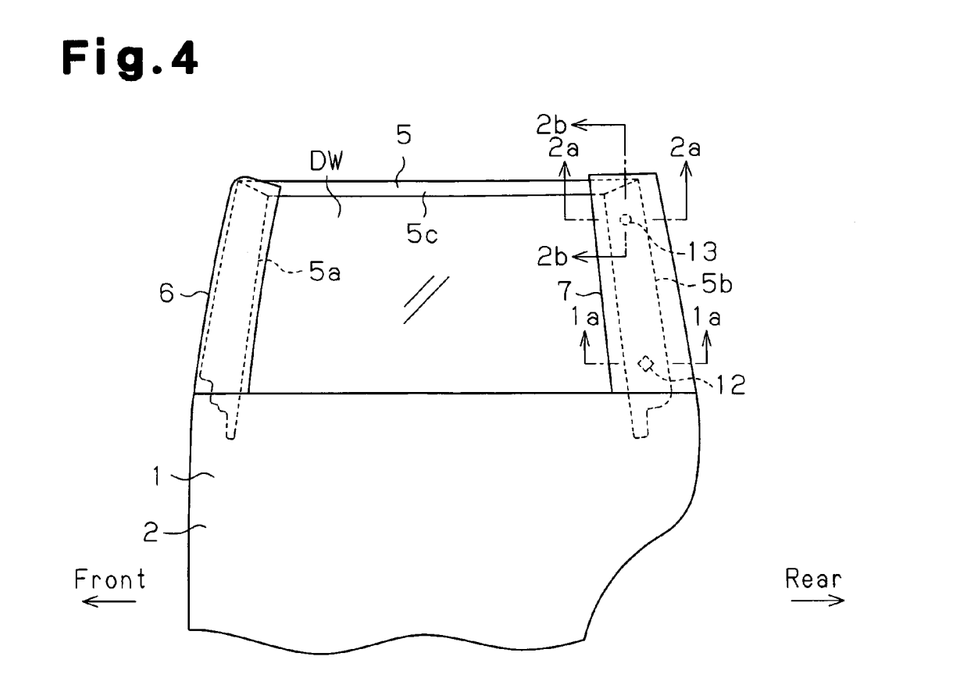
FIG. 4 is a side view showing an upper portion of a vehicle door in the present embodiment from an upper side of the vehicle in a widthwise direction.

FIG. 4 is a side view showing a garnish coupling structure according to one embodiment of the present invention applied to an upper portion of a vehicle door from an outer side of a vehicle in a widthwise direction.

As shown in FIG. 4, a vehicle door 1 includes a lower portion formed by a door body 2. The door body 2 is a hollow structural body obtained by joining an outer door panel, which forms an outer door plate, and an inner door panel (not shown), which forms an inner door plate. A door window glass DW, which moves into and out of an upper opening in the door body 2, is arranged in the door body 2.

The vehicle door 1 includes a door frame 5, which is arranged on a top portion of the door body 2. The door frame 5 forms a window sash, that is, a sash that holds the rim of the door window glass DW. The door frame 5 is molded to be tetragonal and is open in a downward direction. The door frame 5 includes a front frame portion 5a and rear frame portion 5b, which extend in a vertical direction of the vehicle, and an upper frame portion 5c, which is, for example, welded and fixed to the top ends of the front frame portion 5a and rear frame portion 5b to extend between the top ends of the front frame portion 5a and rear frame portion 5b. The front frame portion 5a includes a bottom portion fixed to a front top portion of the door body 2 (e.g., inner door panel). The rear frame portion 5b includes a bottom portion fixed to a rear top portion of the door body 2 (e.g., inner door panel). The front frame portion 5a, the rear frame portion 5b, and the upper frame portion 5c are formed, for example, by roll-molding a metal plate and have a generally uniform cross-sectional shape in the longitudinal direction.

The vehicle door 1 of the present embodiment is a rear door arranged rearward in the vehicle from a front door. The front frame portion 5a and the rear frame portion 5b are arranged in correspondence with a B pillar and a C pillar of the vehicle body. A garnish 6, which is formed by a synthetic resin plate that covers the front frame portion 5a from the outer side in the widthwise direction of the vehicle, is attached to the front frame portion 5a. Further, a garnish 7, which is formed by a synthetic resin plate that covers the rear frame portion 5b from the outer side in the widthwise direction of the vehicle (vehicle outer side), is attached to the rear frame portion 5b.

Figure 1A:
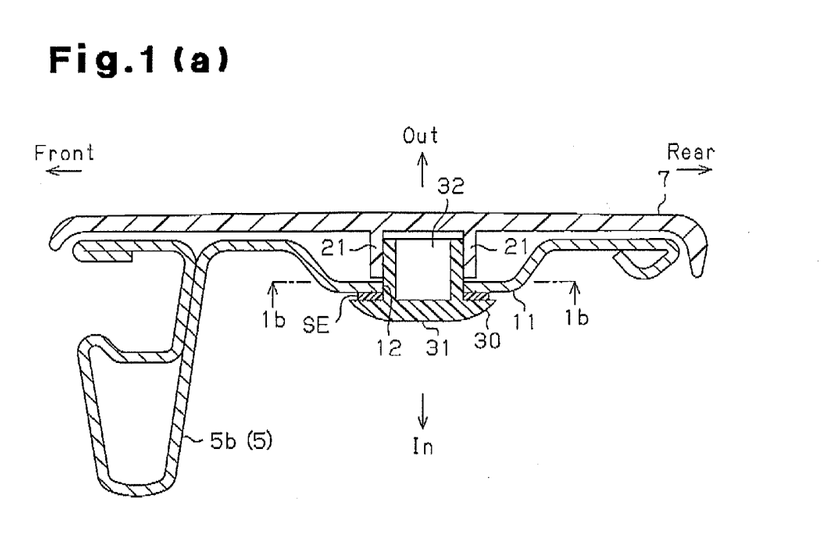
FIG. 1(a) is a cross-sectional showing a garnish coupling structure according to one embodiment of the present invention taken along line 1a-1a in FIG. 4.
Figure 1B:
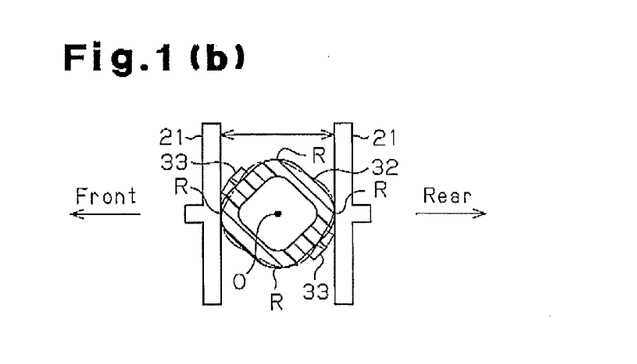
FIG. 1(b) is a cross-sectional view taken along line 1b-1b in FIG. 1(a)
Figure 2A:
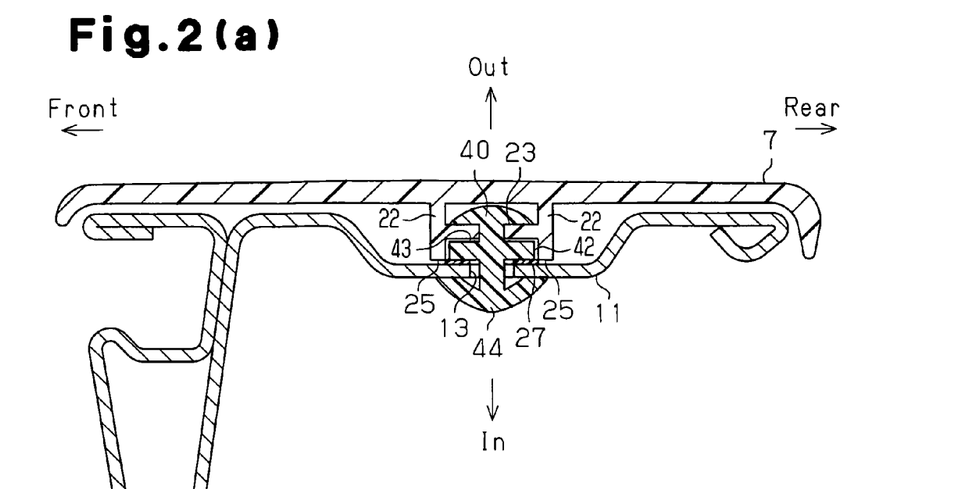
FIG. 2(a) is a cross-sectional view taken along line 2a-2a in FIG. 4.
Figure 2B:
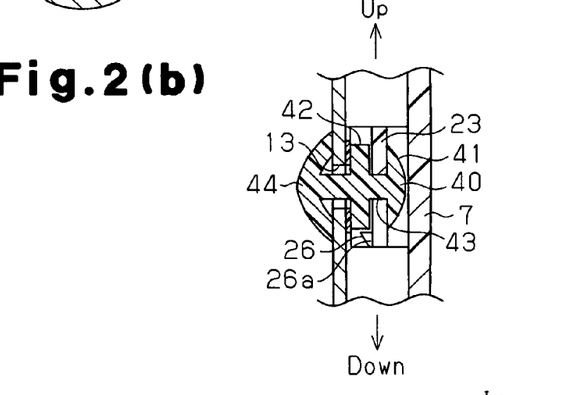
FIG. 2(b) is a cross-sectional view taken along line 2b-2b in FIG. 4.
Figure 2C:
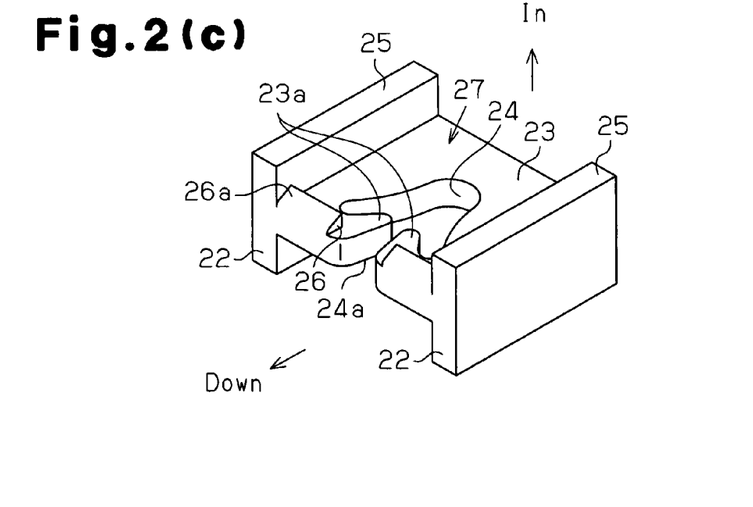
FIG. 2(c) is a perspective view showing a portion to which a clip is attached and which is arranged on an inner surface of a garnish.

FIG. 1(a) is a cross-sectional taken along line 1a-1a in FIG. 4. FIG. 1(b) is a cross-sectional view taken along line 1b-1b in FIG. 1(a). FIG. 2(a) is a cross-sectional view taken along line 2a-2a in FIG. 4. FIG. 2(b) is a cross-sectional view taken along line 2b-2b in FIG. 4. FIG. 2(c) is a perspective view showing the garnish 7 from an inner side of the vehicle in the widthwise direction (rear side).

As shown in FIG. 1(a), the rear frame portion 5b includes a coupling portion 11, which faces toward the garnish 7. The coupling portion 11 is a single metal plate free from folded and overlapping parts. As shown in FIG. 4, a fitting hole 12 and bonding hole 13 extend through the coupling portion 11 in the thickness-wise direction. The fitting hole 12 is formed in a lower part of the rear frame portion 5b (coupling portion 11). The fitting hole 12 has a square cross-section, with one of its two diagonals extending in the forward/rearward direction (predetermined direction) of the vehicle. The bonding hole 13 is formed in an upper part of the rear frame portion 5b (coupling portion 11).

As shown in FIG. 1(a), the garnish 7 includes two ribs 21, which are plate-shaped and extend inward in the widthwise direction of the vehicle (vehicle inner side). The ribs 21 are separated from each other by a distance corresponding to the width of the fitting hole 12 in the forward/rearward direction (predetermined direction) of the vehicle. The ribs 21 face toward the front and rear ends of the fitting hole 12 in the forward/rearward direction of the vehicle (two peaks of the square fitting hole 12).

Figure 3:
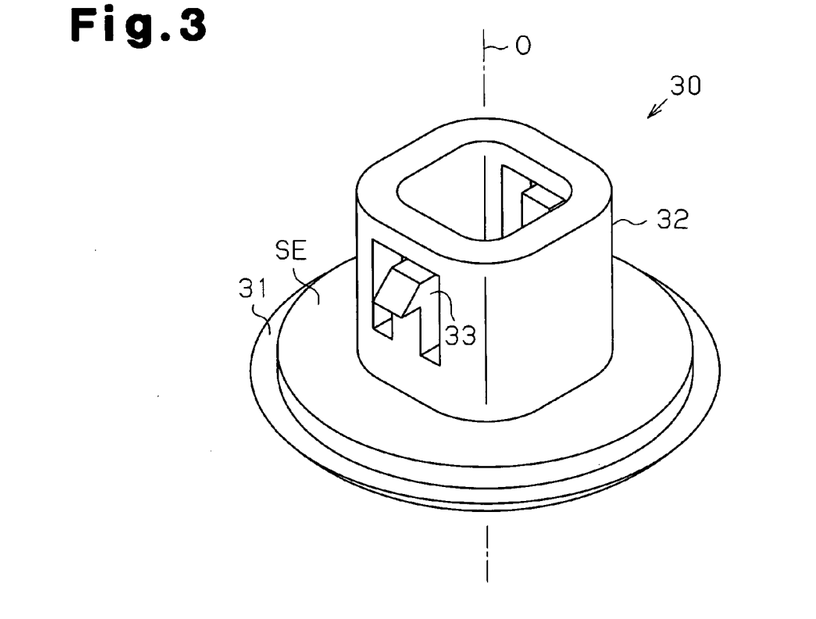
FIG. 3 is a perspective view showing a clip of the present embodiment.

A clip 30 is attached to the fitting hole 12. The clip 30 is formed from, for example, synthetic resin. As shown in FIGS. 1(b) and 3, the clip 20 includes a disk-shaped head 31 and a tube 32, which has a square cross-section. The tube 32 extends from the head 31 and is fitted to the fitting hole 12. The head 31 is bonded to the coupling portion 11 near the fitting hole 12. An annular seal SE is arranged around the fitting hole 12 so that the gap between the head 31 and the coupling portion 11 is liquid tight.

As shown in FIG. 1(b), the tube 32 includes four round corners R. Specifically, the corners R extend along a circumferential surface R that lies along the axis O of the tube 32. The tube 32 of the clip 30 attached to the fitting hole 12 may be displaced relatively about the axis O from its angular position relative to the two ribs 21 of the garnish 7. Even in such a case, as long as the displaced amount is within a certain range (specifically, within a range of a center angle of an arc forming the circumferential surface R), the dimension between the two corners of the tube 32 lying in the forward/rearward direction of the vehicle remain the same.

Further, in the clip 30, two engagement hooks 33 are respectively formed on two of the four side surfaces of the tube 32 (the upper left surface and lower right surface in FIG. 1(b)). As shown in FIG. 3, each engagement hook 33 extends from a basal end to a distal end of the tube 32 in a hole formed in the side surface of the tube 32. A projection projects outward of the tube 32 from the distal portion of each engagement hook 33. Each engagement hook 33 is resiliently deformable about its basal end, which is connected to the tube 32. When the tube 32 is inserted into the fitting hole 12, the projections of the engagement hooks 33 are pressed by the inner walls of the fitting hole 12. This resiliently deforms the engagement hooks 33 as the tube 32 advances in the fitting hole 12. As the projections of the engagement hooks 33 pass by the fitting hole 12, the engagement hooks 33 resiliently return to their original forms and engage with the coupling portion 11 around the fitting hole 12. This prevents separation of the clip 30 from the fitting hole 12 (coupling portion 11). That is, the engagement force of the engagement hooks 33 fastens the clip to the fitting hole 12. Further, the seal SE, which is held between the head 31 and the coupling portion 11, is compressed thereby obtaining a sealing capability.

The two ribs 21 of the garnish 7 hold the distal portion of the tube 32, which projects outward in the widthwise direction of the vehicle from the fitting hole 12, in the forward/rearward direction of the vehicle. As shown in FIG. 1(b), the ribs 21 hold the tube 32 at two of its corners. This attaches the lower portion of the garnish 7 to the rear frame portion 5b (lower part of the coupling portion 11).

As shown in FIGS. 2(a) to 2(c), the garnish 7 includes two plate-shaped side walls 22, which extend inward in the widthwise direction of the vehicle, and a support wall 23, which connects the distal ends of the two side walls 22. The support wall 23 is formed at a position facing toward the bonding hole 13. The support wall 23 includes a mushroom-shaped engagement groove 24, which opens toward the lower side. The support wall 23 includes two extension pieces 23a, which extend diagonally upward toward each other from the lower end of the support wall 23. The engagement groove 24 includes a guide hole 24a, which gradually narrows upward between the two extension pieces 23a.

The garnish 7 further includes two engagement walls 25, which extend inward in the widthwise direction of the vehicle from the support wall 23 continuously with and along the side walls 22. Two engagement projections 26 extend inward in the widthwise direction of the vehicle from the two sides of the engagement groove (guide hole 24a). As shown in FIG. 2(b), the engagement projections 26 respectively include guide surfaces 26a, which are inclined upward away from the garnish 7 (inward in the widthwise direction of the vehicle). The support wall 23, the two engagement walls 25, and the two engagement projections 26 form a tetragonal fitting recess 27, which opens upward.

A bonding clip 40 is attached to the engagement groove 24. The bonding clip 40 is formed from, for example, synthetic resin. The bonding clip 40 includes a first head 41, which is arranged at the outer side of the support wall 23 in the widthwise direction of the vehicle, and a second head 42, which is arranged at the inner side of the support wall 23 in the widthwise direction of the vehicle. The first and second heads 41 and 42 hold the support wall 23 around the engagement groove 24. The second head 42 is tetragonal thereby allowing for fitting in the fitting recess 27.

A neck 43, which is inserted into the engagement groove 24, connects the first and second heads 41 and 42. The neck 43 has an outer diameter that is smaller than the open width of the lower end of the guide hole 24a and larger than the open width of the upper end of the guide hole 24a. Accordingly, when the neck 43 is inserted into the engagement groove 24 from the guide hole 24a, the neck 43 pushes and resiliently deforms the two extension pieces 23a. As a result, the neck 43 moves into the upper portion of the engagement groove 24. Then, the two extension pieces 23a, which are released from the force applied by the neck 43, are resiliently returned to their original forms. At the same time, the second head 42, which is guided by the guide surfaces 26a of the two engagement projection 26, moves over the engagement projections 26 and enters the fitting recess 27 thereby engaging the two engagement walls 25 and two engagement projections 26. This prevents separation of the neck 43 from the engagement groove 24 with the two extension pieces 23a. Further, the bonding clip 40 is attached to the engagement groove 24 in a state in which the fitting recess 27 prevents separation and rotation of the second head 42.

Further, the bonding clip 40 includes an umbrella-shaped separation prevention portion 44, which extends from the second head 42 opposite to the first head 41. The separation prevention portion 44 is inserted through the bonding hole 13 to project inward from the coupling portion 11 in the widthwise direction of the vehicle and engage with the coupling portion 11 around the bonding hole 13. This couples the upper part of the garnish 7 to the rear frame portion 5b (upper part of the coupling portion 11) with the bonding clip 40.

A method for coupling the garnish 7 to the rear frame portion 5b will now be described. Before coupling the garnish 7 to the rear frame portion 5b, the clip 30 is attached to the fitting hole 12 of the rear frame portion 5b (coupling portion 11), and the bonding clip 40 is attached to the engagement groove 24 of the garnish 7. In this state, the separation prevention portion 44 of the bonding clip 40 is aligned with the bonding hole 13 to position the garnish 7 relative to the rear frame portion 5b in the vertical direction and forward/rearward direction of the vehicle. Further, the two ribs 21 are aligned with the tube 32 of the clip 30 to position the garnish 7 relative to the rear frame portion 5b in the forward/rearward direction of the garnish 7.

Then, the garnish 7 is pushed toward the rear frame portion 5b inward in the widthwise direction of the vehicle. This deforms and inserts the separation prevention portion 44 of the bonding clip 40 into the bonding hole 13. Subsequently, as the separation prevention portion 44 resiliently returns to its original form, the separation prevention portion 44 is engaged with the coupling portion 11 and prevented from being separated from the bonding hole 13 (coupling portion 11) at the inner side in the widthwise direction of the vehicle. The two ribs 21 of the garnish 7 hold the distal portion of the tube 32 that projects from the fitting hole 12 outward in the widthwise direction of the vehicle. In this manner, the garnish 7 is supported and fixed to the rear frame portion 5b.

The present embodiment has the advantages described below.

(1) In the present embodiment, the engagement hooks 33 are engaged with the rim of the fitting hole 12 to prevent separation from the fitting hole 12 (coupling portion 11). The garnish 7 holds the distal portion of the tube 32, which projects outward from the fitting hole 12 in the widthwise direction of the vehicle, with the two ribs 21. In this manner, the clip 30 couples the garnish 7 to the rear frame portion 5b. In this case, the head 31 covers the fitting hole 12. Thus, the fitting hole 12 and rust formed around the fitting hole 12 are not exposed inward in the widthwise direction of the vehicle (inner side of the vehicle door 1). This improves the aesthetic appeal.

Further, the head 31 is bonded to the rim of the fitting hole 12 at the inner side of the coupling portion 11 in the widthwise direction of the vehicle. Thus, the projection length of the clip from the coupling portion 11 inward in the widthwise direction of the vehicle is within the thickness range of the head 31. This prevents the layout space for the clip 30 from being increased at the inner side of the coupling portion in the widthwise direction of the vehicle. In other words, the portion of the tube 32 that may be held by the two ribs 21 is located outward from the coupling portion 11 in the widthwise direction of the vehicle. This saves space at the inner side of the coupling portion 11 in the widthwise direction of the vehicle.

The two ribs 21 hold the two corners of the tube 32 lying in the forward/rearward direction of the vehicle. Thus, the ribs 21 are arranged so that the distance between the two is longest. Accordingly, the engagement hooks 33 are arranged in the space formed between the two ribs 21 and tube 32. Even when the engagement hooks 33 are arranged on only some of the four side surfaces of the tube 32 (two side surfaces facing toward each other), interference does not occur between the engagement hooks 33 and the two ribs 21 as long as the tube 32 is located at any one of angular positions located every 90 degrees about the axis O of the tube 32 at which the tube 32 can be fitted to the fitting hole 12. Accordingly, restrictions are reduced on the angular position of the tube 32 (clip 30). This improves the coupling efficiency.

(2) In the present embodiment, the four corners of the tube 32 lie along the circumferential surface R, which is a circle of which the center coincides with the axis O of the tube 32. Accordingly, even when the tube 32 of the clip 30 is displaced from its original angular position relative to the two ribs 21 of the garnish 7 due to, for example, product variations or coupling variations, as long as the displacement amount is within a certain range, the dimension between the two corners of the tube 32 lying along the forward/rearward direction of the vehicle remains the same. This prevents a decrease in the holding force of the tube 32 with the two ribs 21, that is, the fastening force of the rear frame portion 5b (door frame 5) and the garnish 7 produced by the clip 30.

(3) In the present embodiment, the separation prevention portion 44 of the bonding clip 40, which is attached to the engagement groove 24 (support wall 23), is engaged with the rim of the bonding hole 13 at the inner side of the coupling portion 11 in the widthwise direction of the vehicle. This couples the garnish 7 to the coupling portion 11 (door frame 5) positioned in the forward/rearward direction of the vehicle in addition to a different direction (the vertical direction of the vehicle). Here, the second head 42 is fitted to the two engagement walls 25 and the two engagement projections to prevent rotation of the bonding clip 40. Further, the engagement projections 26 are arranged at the lower end of the support wall 23 that is located at the open side of the engagement groove 24. This prevents the bonding clip 40 from falling down from the engagement groove 24.

(4) In the present embodiment, the second head 42 is guided along the guide surfaces 26a of the two engagement projections 26. This smoothly moves the second head 42 toward the fitting recess 27, and smoothly attaches the bonding clip 40 to the engagement groove 24.

(5) In the present embodiment, the two extension pieces 23a restrict downward movement of the neck 43. This further ensures that the bonding clip 40 is prevented from falling down from the engagement groove 24.

(6) In the present embodiment, the seal SE is arranged between the coupling portion 11 and the head 31 of the clip 30. This prevents rusting of the fitting hole 12 and the like.

The above embodiment may be modified as described below.

Figure 7:
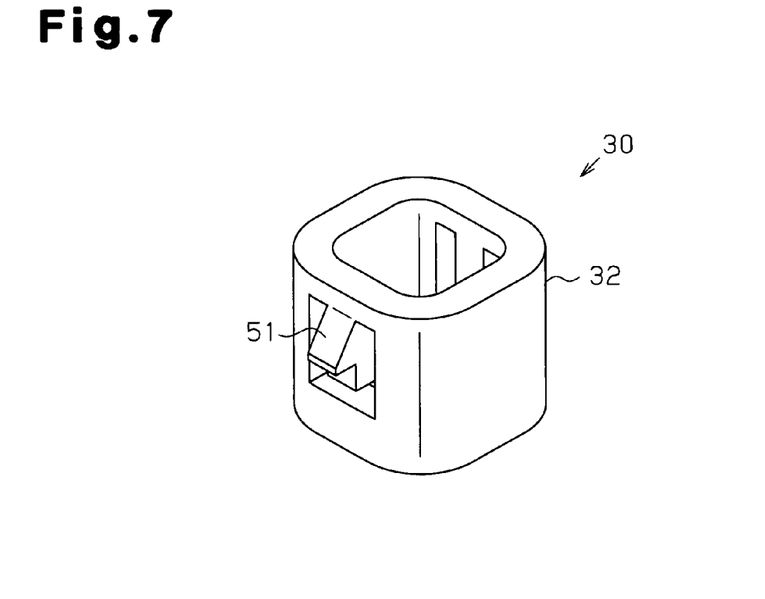
FIG. 7 is a perspective view showing a further example of the present invention.

An engagement piece 51 such as that shown in FIG. 7 may be arranged in the clip 30. The engagement piece 51 extends from the distal end to the basal end of the tube 32 in a hole formed in the side wall of the tube 32. Further, the engagement piece 51 is resiliently deformable about its basal end, which is connected to a distal portion of the tube 32.

Figure 8:
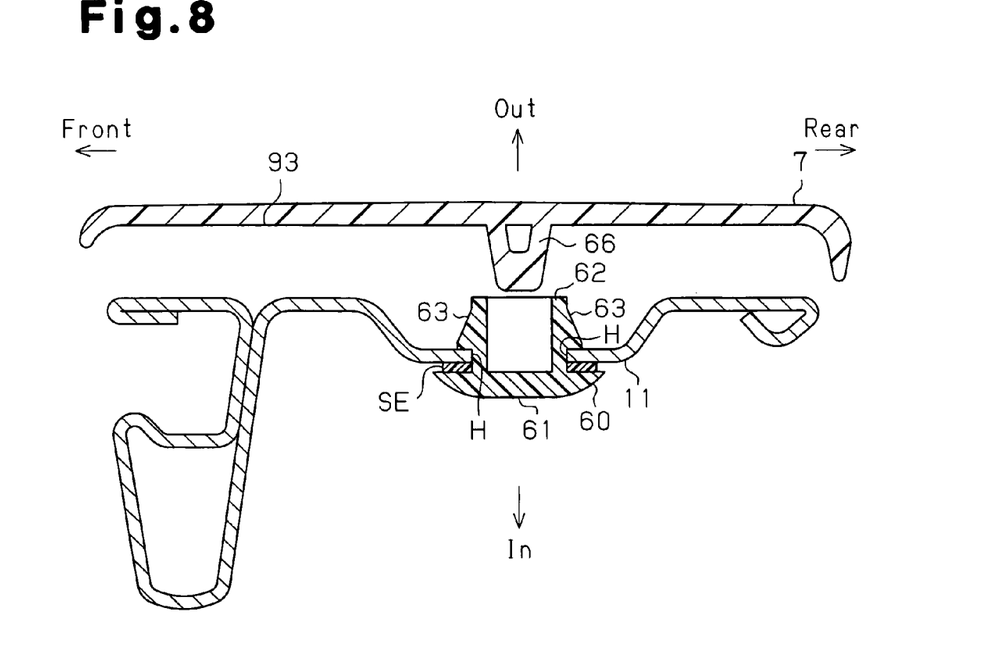
FIG. 8 is a cross-sectional view showing a further example of the present invention.
Figure 9:
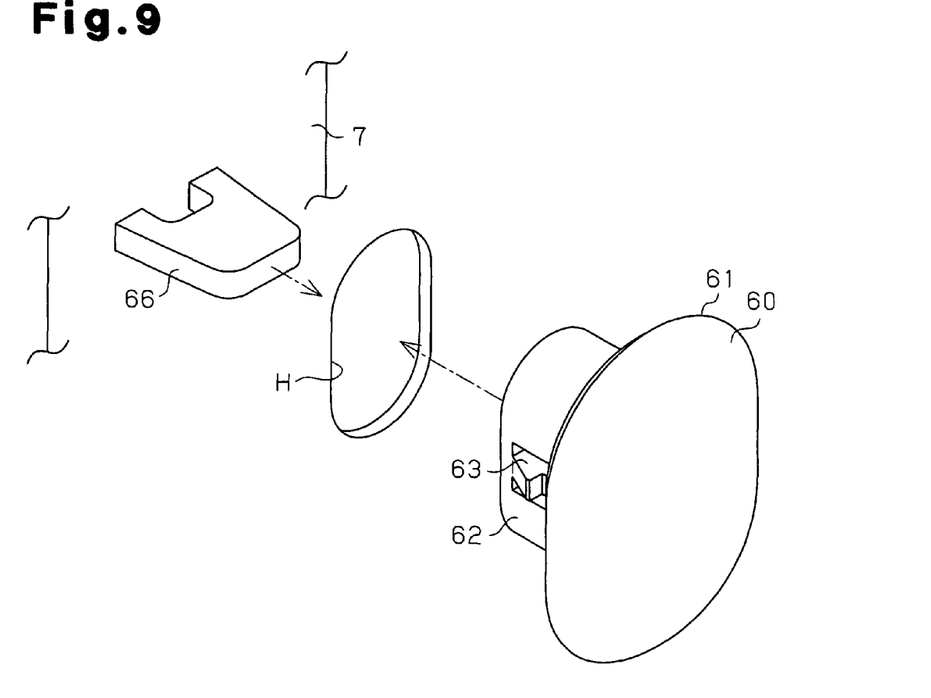
FIG. 9 is an exploded perspective view showing a coupling structure of FIG. 8.
Figure 10:
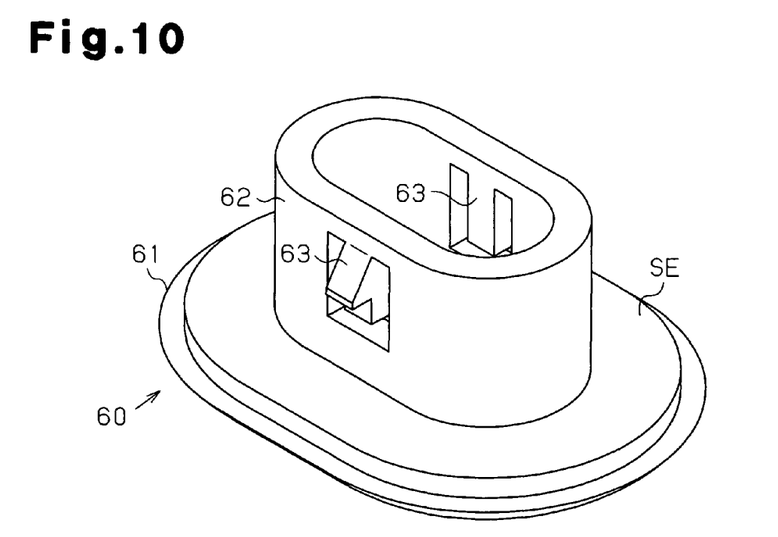
FIG. 10 is a perspective view of a clip used in the coupling structure of FIG. 8.

As shown in FIGS. 8 to 10, a clip 60 formed from, for example, synthetic resin, may be fitted to an oblong fitting hole H formed in the coupling portion 11. More specifically, the clip 60 includes an oblong head 61 and a tube 62, which has an oblong cross-section. The head 61 is bonded to the rim of the fitting hole H at the inner side of the coupling portion 11 in the widthwise direction of the vehicle. The tube 62 projects from the head 61 and is shaped in conformance with the fitting hole H. Two engagement hooks 63 are respectively formed on two side surfaces of the tube 62. Each engagement hook 63 has substantially the same structure as the engagement hook 51 shown in FIG. 7. The engagement hooks 63 are engaged with the rim of the fitting hole H at the outer side of the coupling portion 11 in the widthwise direction of the vehicle. This prevents the clip 60 from falling out of the fitting hole H (coupling portion 11).

Further, the garnish 7 includes a plate-shaped boss 66, which is press-fitted to the tube 62. The boss 66 is held between opposing walls in the lateral direction of the tube 62, which has an oblong cross-section. In this case, the boss 66 is press-fitted into the tube 62. This couples the lower part of the garnish 7 to the rear frame portion 5b (lower part of the coupling portion 11) with the clip 60. In particular, the tube 62 of the clip 60 and the fitting hole H are each oblong. This absorbs thermal contraction of the garnish 7.

The engagement hook 33 of the clip 30 need only be arranged on one or more of the four side surfaces of the tube 32.

In FIG. 1(b), the two corners of the tube 32 lying along the forward/rearward direction of the vehicle are held between the two ribs 21 spaced apart in the forward/rearward direction of the vehicle. However, the orientation and location of the fitting hole 12, into which the tube 32 is fitted, and the ribs 21 may be changed so that the two corners arranged along the vertical direction of the vehicle are held by, for example, two ribs spaced apart in the vertical direction of the vehicle.

The present invention may be applied between the front frame portion 5a and the garnish 6. Further, the present invention may be applied to, for example a front door that serves as a vehicle door.

The invention claimed is:

1. A coupling structure comprising:
a door frame adapted to form a window sash of a vehicle door, wherein the door frame includes a coupling portion, which is formed by a single plate, and a fitting hole, which extends through the coupling portion in a thickness-wise direction of the coupling portion, and the fitting hole has a generally square shape, which defines a diagonal that extends in a predetermined direction;
a garnish that faces toward the coupling portion of the door frame and covers the door frame from an outer side in a widthwise direction of the vehicle, wherein the garnish includes two ribs extending inward in the widthwise direction of the vehicle and respectively extending inward toward two ends of the fitting hole that lie along the diagonal, and the two ribs are arranged parallel to each other and separated by a distance in the predetermined direction; and
a clip attached to the fitting hole, wherein the clip includes a head, which is bonded to a rim of the fitting hole at an inner side of the coupling portion in the widthwise direction of the vehicle, a tube, which has a square cross-section, projects from the head, and is fitted into the fitting hole, and an engagement hook, which is arranged on a side surface of the tube, wherein the tube includes a distal portion projecting through the fitting hole and outward from the coupling portion in the widthwise direction of the vehicle, the two ribs hold two corners of the distal portion lying along the predetermined direction, and the engagement hook is engaged with the rim of the fitting hole at the outer side of the coupling portion in the widthwise direction of the vehicle.

2. The coupling structure according to claim 1, wherein the tube includes four corners, each of the corners forming a curved surface lying along a circle, wherein the circle has a center along a longitudinal axis of the tube.

3. The coupling structure according to claim 1, wherein
the door frame includes a bonding hole that extends through the coupling portion in the thickness-wise direction of the coupling portion;
the garnish includes:
two side walls extending inward in the widthwise direction of the vehicle;
a support wall connecting distal ends of the two side walls and facing toward the bonding hole;
an engagement groove formed in the support wall and open downward;
two engagement walls extending along the two side walls and facing inward from the support wall in the widthwise direction of the vehicle; and two engagement projections extending in the widthwise direction of the vehicle from a lower end portion of the support wall at two opposite sides of the engagement groove in the support wall;

the coupling structure further comprises a bonding clip attached to the engagement groove, wherein the bonding clip includes:

a first head arranged at an outer side of the support wall in the widthwise direction of the vehicle;

a second head arranged at an inner side of the support wall in the widthwise direction of the vehicle to hold a rim of the engagement groove with the first head and fitted to the two engagement walls and the two engagement projections; and a separation prevention portion extending from the second head and inserted into the bonding hole to engage with a rim of the bonding hole in the coupling portion at an opposite side of the second head.

4. The coupling structure according to claim 3, wherein the two engagement projections each include a guide surface that guides the second head to a location at which the second head is fitted to the two engagement walls and the two engagement projections.

5. The coupling structure according to claim 3, wherein:

the bonding clip includes a neck inserted through the engagement groove and connecting the first and second heads; and the support wall includes an extension piece that restricts downward movement of the neck.

* * * * *